United States Patent
Li

(10) Patent No.: US 11,546,418 B2
(45) Date of Patent: Jan. 3, 2023

(54) METHOD, CLIENT, SERVER, AND SYSTEM FOR SHARING CONTENT

(71) Applicant: TENCENT TECHNOLOGY (SHENZHEN) COMPANY LIMITED, Guangdong (CN)

(72) Inventor: Ning Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/450,725

(22) Filed: Oct. 13, 2021

(65) Prior Publication Data

US 2022/0030085 A1 Jan. 27, 2022

Related U.S. Application Data

(63) Continuation of application No. 14/588,495, filed on Jan. 2, 2015, now Pat. No. 11,201,911, which is a
(Continued)

(30) Foreign Application Priority Data

Apr. 8, 2013 (CN) .......................... 201310118736.4

(51) Int. Cl.
*H04L 67/10* (2022.01)
*G06F 40/106* (2020.01)
(Continued)

(52) U.S. Cl.
CPC ............ *H04L 67/10* (2013.01); *G06F 16/958* (2019.01); *G06F 40/106* (2020.01); *G06Q 50/01* (2013.01); *H04L 67/01* (2022.05); *H04L 67/02* (2013.01)

(58) Field of Classification Search
CPC ......... H04L 67/10; H04L 67/01; H04L 67/02; G06F 16/958; G06F 40/106
See application file for complete search history.

(56) References Cited

U.S. PATENT DOCUMENTS

| | | | |
|---|---|---|---|
| 6,742,043 B1 * | 5/2004 | Moussa ................. | G06F 16/258 709/230 |
| 6,856,989 B1 | 2/2005 | Zhou | |
| 7,574,486 B1 * | 8/2009 | Cheng ...................... | H04L 9/40 709/236 |
| 2003/0033434 A1 * | 2/2003 | Kavacheri ................. | H04L 9/40 709/219 |

(Continued)

FOREIGN PATENT DOCUMENTS

| | | |
|---|---|---|
| CN | 102271165 A | 12/2011 |
| CN | 102694830 A | 9/2012 |

(Continued)

OTHER PUBLICATIONS

International Search Report issued in corresponding International Application No. PCT/CN2014/073929 dated Jul. 9, 2014.
Office Action issued in corresponding Chinese application 201310118736.4 dated Feb. 15, 2015.

*Primary Examiner* — Suraj M Joshi
(74) *Attorney, Agent, or Firm* — ArentFox Schiff LLP

(57) ABSTRACT

Embodiments of the present disclosure disclose a method, a server, a client, and a system for sharing content. The method includes: obtaining sharing request submitted by the client, the sharing request including a destination website to be shared; obtaining sharing content of the destination website according to the destination website; processing the content of the destination website, and generating an accessible address corresponding to the content of the destination website; and sending the accessible address corresponding to the content of the destination website to the client, such that the client replaces the destination website by using the (Continued)

accessible address and sends a sharing message including the accessible address. The method, the server, the client, and the system can be directed to increase efficiency of visiting sharing content.

19 Claims, 4 Drawing Sheets

Related U.S. Application Data continuation of application No. PCT/CN2014/073929, filed on Mar. 24, 2014.

(51) Int. Cl.
*H04L 67/02* (2022.01)
*G06Q 50/00* (2012.01)
*G06F 16/958* (2019.01)
*H04L 67/01* (2022.01)

(56) References Cited

U.S. PATENT DOCUMENTS

| | | | |
|---|---|---|---|
| 2006/0230030 A1* | 10/2006 | Volpa | G06F 16/9577 709/215 |
| 2009/0144392 A1* | 6/2009 | Wang | H04L 67/306 709/217 |
| 2010/0146597 A1 | 6/2010 | Tanaka | |
| 2010/0186088 A1* | 7/2010 | Banerjee | G06F 21/51 709/224 |
| 2011/0119352 A1 | 5/2011 | Perov | |
| 2011/0185271 A1* | 7/2011 | Aciicmez | G06F 21/563 715/256 |
| 2012/0151313 A1 | 6/2012 | Tsirkin | |

FOREIGN PATENT DOCUMENTS

| | | |
|---|---|---|
| CN | 102891897 | 1/2013 |
| CN | 102929871 A | 2/2013 |
| CN | 102984287 A | 3/2013 |

\* cited by examiner

METHOD, CLIENT, SERVER, AND SYSTEM FOR SHARING CONTENT

CROSS REFERENCE TO RELATED APPLICATIONS

This application is a continuation of U.S. application Ser. No. 14/588,495 filed Jan. 2, 2015, which is a continuation of International Application No. PCT/CN2014/073929, entitled "METHOD, CLIENT, SERVER, AND SYSTEM FOR SHARING CONTENT", filed on Mar. 24, 2014, which claims priority to Chinese Patent Application No. 201310118736.4, entitled "METHOD, CLIENT, SERVER, AND SYSTEM FOR SHARING CONTENT" and filed on Apr. 8, 2013, which are hereby incorporated in their entireties by reference.

FIELD OF THE TECHNICAL

The present disclosure relates to internet technology, and more particularly to a method, a client, a server, and a system for sharing content.

BACKGROUND

Generally, sharing refers to a common network feature existing in various internet clients and browsers. Users can share feature of texts, pictures, videos, web links, and other content through certain channels, such as e-mail, social networking, or other channels to other destination users. Typically, the users send or publish Universal Resource Locator (URL) of contents to the destination users, so that other users can view the contents by opening the website. In existing technology, channels for sharing content generally include e-mail, micro-blogging, Social Networking Service (SNS) space, instant messaging (IM) tools. As web content on the internet often contains a variety of redundant information, such as a variety of advertising, relevant recommendations, pop news, the users are easily distracted from viewing the shared content by the redundant information.

SUMMARY

The embodiments of the present disclosure provide a method, a server, a client, and a system for sharing content. The method, the server, the client, and the system are directed to solve one or more problems set forth above and other problems, so that efficiency of visiting sharing content can be increased.

The technical solutions provided by the embodiments of the present disclosure include the following.

A method for sharing content, includes: obtaining sharing request submitted by the client, the sharing request including a destination website to be shared; obtaining sharing content of the destination website according to the destination website; and processing the content of the destination website, and generating an accessible address corresponding to the content of the destination website; and sending the accessible address corresponding to the content of the destination website to the client, such that the client replaces the destination website by using the accessible address and sends a sharing message including the accessible address.

A sharing processing server, includes: a sharing request obtaining module, configured for obtaining sharing request, the sharing request comprising destination website; a content obtaining module, configured for obtain content of the destination website; a processing module, configured for processing content of the destination website, and generates an accessible address corresponding to the content of the destination website; and a sending module, configured for sending the accessible address corresponding to the content of the destination website to the client, such that the client replaces the destination website by using the accessible address and sends a sharing message including the accessible address.

A method for sharing content, includes: submitting sharing request to a sharing processing server, the sharing request comprising destination website; obtaining an accessible address corresponding to the content of the destination website processed by the sharing processing server; replacing the destination website by the accessible address and sending a sharing message including the accessible address, the sharing message including the accessible address of the content.

A client includes: a destination submitting module to a sharing processing server, configured for submitting sharing request, the sharing request comprising destination website; a content obtaining module, configured for obtaining an accessible address corresponding to the content of the destination website processed by the sharing processing server; a releasing module, configured for replacing the destination website by the accessible address and sending a sharing message including the accessible address, the sharing message including the accessible address of the content.

A system includes an above mentioned server and an above mentioned client.

As can be seen from the above technical solutions, according to the embodiments of the present disclosure, the above sharing processing server processes content of the destination website according to the sharing request submitted by the client, and further sends an accessible address corresponding to the content of the destination website, thus realizing sharing function. In this way, the visitor has better experience when visiting the shared content of the users, and efficiency of visiting sharing content can be increased.

DETAILED DESCRIPTION OF ILLUSTRATED EMBODIMENTS

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
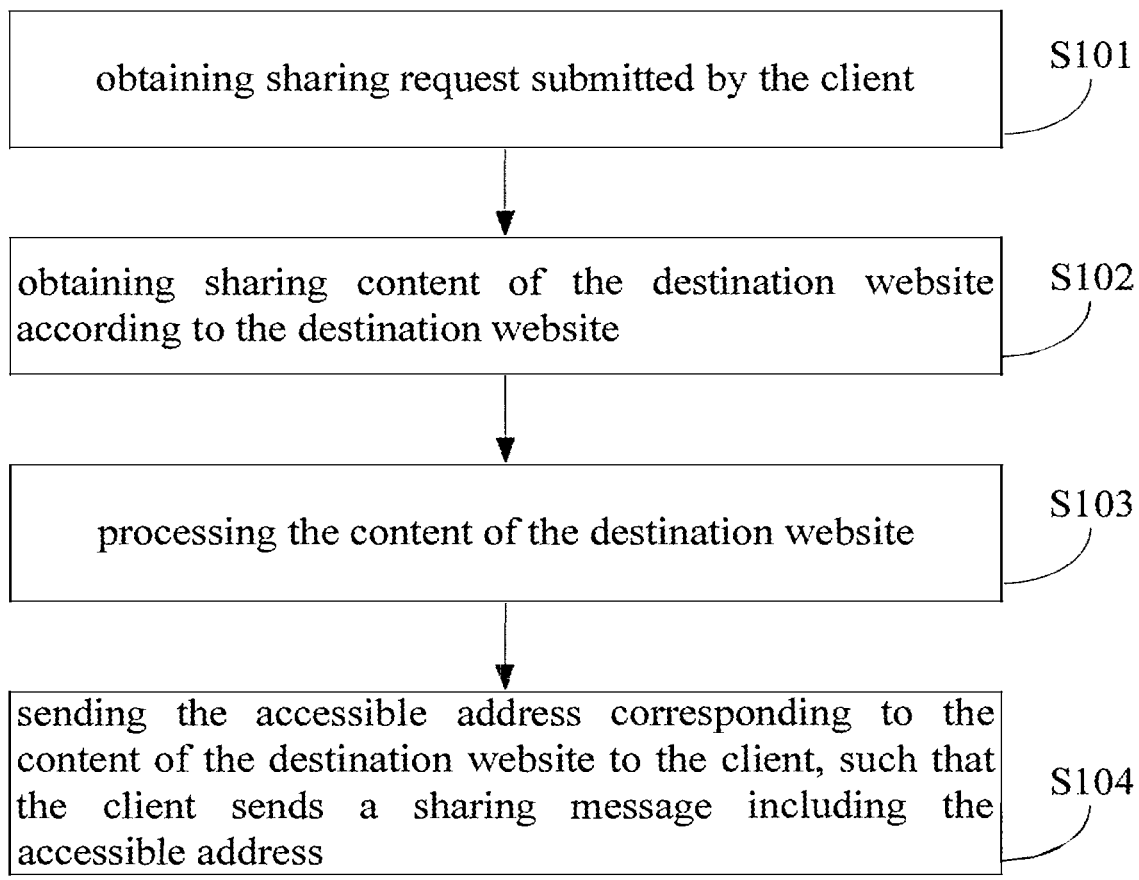
FIG. 1 is a basic flowchart of an exemplary method for sharing content, in accordance with a first embodiment of the present disclosure.

FIG. 1 is a basic flowchart of an exemplary method for sharing content, in accordance with a first embodiment of the present disclosure. The method for sharing content can be applied in network servers with sharing supporting function, such as Mail servers, SNS (Social Networking Services, the social networking service) servers, instant messaging servers, etc. In this embodiment, the server for applying the content sharing method can be referred to as sharing processing server. In this embodiment, the method shown in FIG. 1 includes step S101 to S104.

Step S101, obtaining sharing request submitted by the client, the sharing request including a destination website to be shared.

In this embodiment, the sharing request is initiated by clicking a button corresponding to sharing function on the user interface of a client (or user terminal). The sharing request is submitted to the sharing processing server. The sharing request includes a destination website (Uniform Resource Locator, URL) to be shared.

Step S102, obtaining sharing content of the destination website, according to the destination website.

In this embodiment, the sharing processing server can obtain content of the destination website by analyzing the destination website. The content of the destination website may include a page of the destination, a video of the destination, a photo of the destination. Optionally, before obtaining content of the destination website, the sharing processing server can apply safety testing to the destination website. In operation, the sharing processing server can match the website of the shared content with websites stored in a risk website database, to identify whether the destination website is a counterfeit website, or to identify whether the page of the website contains malicious plug-ins. The sharing processing server obtains sharing content of the destination website, after confirming the destination website is safe. If the destination website is confirmed to be unsafe, the sharing processing server sends a notice showing processing failures to the client, or directly sends the original website of destination to the client.

Step S103, processing the content of the destination website, and generating an accessible address corresponding to the content of the destination website.

In this embodiment, the sharing processing server processes the content of the destination website, includes: cleaning redundant information of the shared content of the destination website and/or re-arranging layout of the content of the destination website, in which:

In this embodiment, cleaning the content of the destination website includes removing unnecessary data and elements of the content in the destination by using intelligent processing method. Take website as an example, the cleaning method may include:

1) a rendering engine parses the pages and arranges layout of the pages, and further obtain coordinates, area, fonts and other visual information of the DOM (Document Destination Model) node in the pages.
2) dividing the DOM structure of the page into a variety of blocks using visual information thereof.
3) identifying the blocks on the pages, distinguishing valid blocks: such as title blocks, text blocks, and time blocks, etc.
4) extracting core field in the effective blocks, clear other data and other elements in the web pages.

In this embodiment, the layout of the shared content of the destination website is re-arranged to adjust different types of terminal, different display pixel size, and different ratios, and other browse parameters. That is, the layout of the shared content of the destination website is re-arranged to adjust content of the at least one preset layout of the above browse parameters. When other users visit the content of the processed destination via different terminal types (such as mobile phones, computers and tablet PCs), sizes or scales of different display pixel, content of the destination website matching with its browse parameters can be viewed.

After the content of the destination website is processed, the sharing processing server generates an accessible address corresponding to the content of the destination website. That is, the content of the destination website of different layout is related to a unique accessible address. When the user visits the content of the destination website using the accessible address, the website server storing the content of the destination website sends contents of the destination corresponding to the layout to the client, after identifying the browse parameters of the user terminal.

Step S104, sending the accessible address corresponding to the content of the destination website to the client. In this way, the client (terminal) replaces the destination website by using the accessible address and sends a sharing message including the accessible address.

In this embodiment, the sharing processing server sends the sharing message to the client if the content of the destination website is processed. The client replaces the destination website by the accessible address and sends a sharing message including the accessible address, thus realizing sharing function, that is, sending sharing message including the accessible address.

Figure 2:
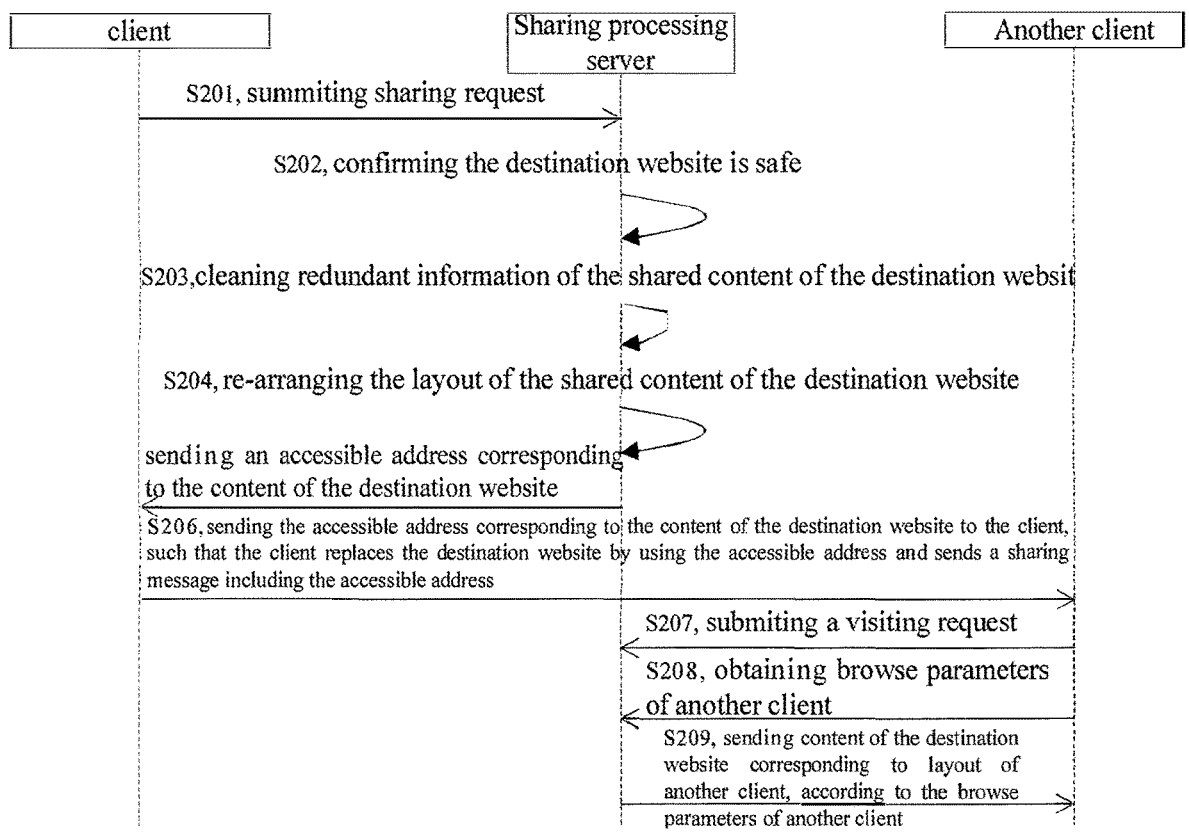
FIG. 2 is a basic flowchart of another exemplary method for sharing content, in accordance with a second embodiment of the present disclosure.

FIG. 2 is a basic flowchart of an exemplary method for sharing content, in accordance with a second embodiment of the present disclosure. In this embodiment, the method shown in FIG. 2 includes step S201 to S209.

Step S201, a client submits sharing request to a sharing processing server, the sharing request including a destination website.

In this embodiment, the sharing request is initiated by clicking a button corresponding to sharing function on the user interface of a client (or user terminal), the sharing request is submitted to the sharing processing server. The sharing request includes a destination website (URL) to be shared.

Step S202, the sharing processing server applies safety testing to the destination website, if the destination website is confirmed to be safe, then step S203 is applied. If the destination website is confirmed to be unsafe, the sharing processing server sends a notice showing processing failures to the client, or directly sends the original website of destination to the client. In operation, the sharing processing server can match the website of the shared content with websites stored in a risk website database, to identify whether the destination website is a counterfeit website, or to identify whether the page of the website contains malicious plug-ins.

Step S203, the sharing processing server cleans redundant information of the shared content of the destination website, if the redundant information of the shared content of the destination website is cleaned successfully, then step 204 is applied, or the sharing processing server sends a notice showing processing failures to the client, or directly sends the original website of destination to the client. In operation, cleaning the content of the destination website includes removing unnecessary data and elements of the content in the destination by using intelligent processing method. Take website as an example, the cleaning method may include:
1) a rendering engine parses the pages and arranges layout of the pages, and further obtain coordinates, area, fonts and other visual information of the DOM (Document Destination Model) node in the pages.
2) dividing the DOM structure of the page into a variety of blocks using visual information thereof.
3) identifying the blocks on the pages, distinguishing valid blocks: such as title blocks, text blocks, and time blocks, etc.
4) extracting core field in the effective blocks, clear other data and other elements in the web pages.

Step S204, the sharing processing server re-arranges the layout of the shared content of the destination website, and obtains content of the at least one preset layout. In this embodiment, the layout of the shared content of the destination website is re-arranged by the sharing processing server to adjust different types of terminal (such as mobile phones, computers and tablet PCs), different display pixel size, and different ratios, and other browse parameters. When other users visit the content of the processed destination via different terminal types, sizes or scales of different display pixel, content of the destination website matching with its browse parameters can be viewed.

Step S205, the sharing processing server sends an accessible address corresponding to the content of the destination website. In this embodiment, the sharing processing server generates a unique accessible address corresponding to the content of the destination website with at least one pre-arranged layout. When the user visit the accessible address corresponding to the content of the destination website, the sharing processing server sends content of the destination website with the prearranged layout by using the browse parameters of the user's terminal.

Step S206, the client (terminal) replaces the destination website by using the accessible address and sends a sharing message including the accessible address. The sharing message includes the accessible address of the content of the destination website. Specifically, the client may replace the destination website into accessible address sent by the sharing processing server, and thus realizing sharing function, that is, sending sharing message including the accessible address. In this embodiment, the client sends the sharing message to another client. In alternative embodiments, the client can release the accessible address on personal space or homepage of the social networking service (SNS) websites, such that more people can view the shared message.

Step S207, another client submits a visiting request to the sharing processing server according to the accessible address of the content. It is noted, in this embodiment of the present embodiment, the sharing processing server can be used to receive the request and also response to the visiting requests. In alternative embodiments, the sharing processing server can be used to store content of processed destination website in other network resource servers, the accessible address can be linked to the network resource servers, that is, the network resource servers can be used to receive the request and also response to the visiting requests.

Step S208, the sharing processing server obtains browse parameters of another client, the browse parameters includes terminal types, sizes or scales of different display pixel, etc. In alternative embodiments, the steps S207 and S208 can be applied simultaneously.

Step S209, the sharing processing server sends content of the destination website corresponding to layout of another client, according to the browse parameters of another client. In operation, the sharing processing server matches with the content of the destination website in a variety of contents of the destination websites with different layout, according to browse parameters of another client. In addition, the sharing processing server sends content of the destination website corresponding to layout of another client. In this way, a visitor has better experience when visiting the shared content of the users, and efficiency of visiting sharing content can be increased.

Figure 3:
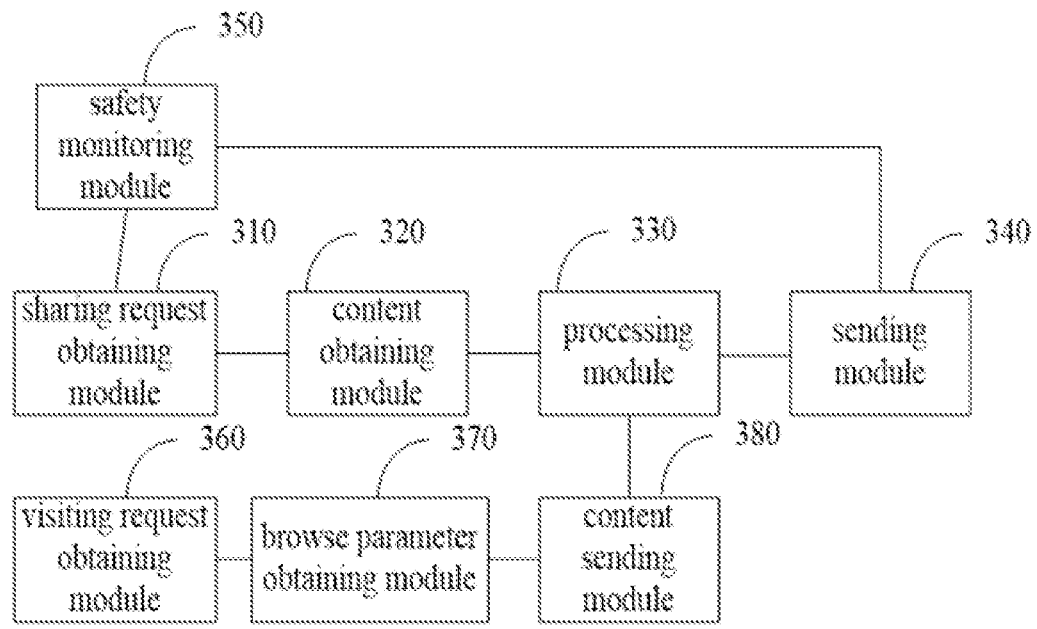
FIG. 3 is a block diagram of a sharing processing server, in accordance with an embodiment of the present disclosure.

FIG. 3 is a block diagram of a sharing processing server, in accordance with an embodiment of the present disclosure. In this embodiment, the server for sharing content can be applied in network servers with sharing supporting function, such as Mail servers, SNS (Social Networking Services, the social networking service) servers, instant messaging servers, etc. In this embodiment, the server for applying the content sharing method can be referred to as sharing processing server. In this embodiment, the sharing processing server shown in FIG. 3 includes a sharing request obtaining module 310, a content obtaining module 320, a processing module 330, and a sending module 340.

The sharing request obtaining module 310 is used to obtain sharing request, the sharing request including a destination website.

In this embodiment, the sharing request is initiated by clicking a button corresponding to sharing function on the user interface of a client (or user terminal), the sharing request is submitted to the sharing processing server. The sharing request includes a destination website (URL) to be shared. In this way, the sharing request obtaining module 310 obtains sharing request submitted by the client.

The content obtaining module 320 is used to obtain content of the destination website, according to the destination website.

In this embodiment, the content obtaining module 320 can analyze the destination website. The content of the destination website may include a page of the destination, a video of the destination, a photo of the destination.

The processing module 330 is used to processing content of the destination website, and generates an accessible address corresponding to the content of the destination website.

Figure 4:
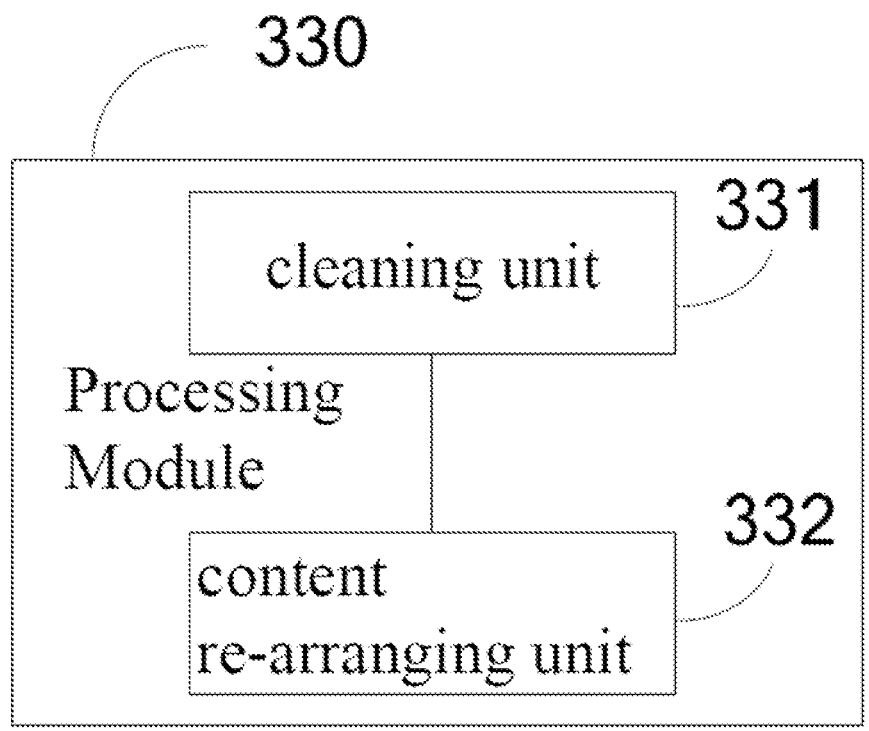
FIG. 4 is a block diagram of a processing module of the server of FIG. 3.

In this embodiment, the processing module 330 is shown in FIG. 4, and includes a cleaning unit 331 and a content re-arranging unit 332.

The cleaning unit 331 is used to clean redundant information of the shared content of the destination website. In this embodiment, cleaning the content of the destination website includes removing unnecessary data and elements of the content in the destination by using intelligent processing method. Take website as an example, the cleaning method may include:
1) a rendering engine parses the pages and arranges layout of the pages, and further obtain coordinates, area, fonts and other visual information of the DOM (Document Destination Model) node in the pages.
2) dividing the DOM structure of the page into a variety of blocks using visual information thereof.
3) identifying the blocks on the pages, distinguishing valid blocks: such as title blocks, text blocks, and time blocks, etc.
4) extracting core field in the effective blocks, clear other data and other elements in the web pages.

The content re-arranging unit 332 is used to re-arrange the layout of the shared content of the destination website, thus obtaining content of at least one preset layout. In this embodiment, the content re-arranging unit 332 re-arranges the layout of the shared content of the destination website to adjust different types of terminal, different display pixel size, and different ratios, and other browse parameters. That is, the layout of the shared content of the destination website is re-arranged by the content re-arranging unit 332 to adjust content of the at least one preset layout of the above browse parameters. When other users visit the content of the processed destination via different terminal types (such as mobile phones, computers and tablet PCs), sizes or scales of different display pixel, content of the destination website matching with its browse parameters can be viewed.

The sending module 340 is used to send an accessible address corresponding to the content of the destination website. In this way, the client (terminal) replaces the destination website by using the accessible address and sends a sharing message including the accessible address. In this embodiment, the sending module 340 generates a unique accessible address corresponding to the content of the destination website with at least one preset layout, and further sends the unique accessible address to the client. When the client receives the accessible address of the content, the client replaces the destination website by the accessible address and sends a sharing message including the accessible address, thus realizing sharing function, that is, sending sharing message including the accessible address. When other user visits the content of the destination website using the accessible address, the website server storing the content of the destination website sends contents of the destination corresponding to the layout to the client, after identifying the browse parameters of the user terminal.

Optionally, the share processing server further includes a safety monitoring module 350. The safety monitoring module 350 is used to identify whether the destination website is safe. The safety monitoring module 350 notifies the content obtaining module 320 to obtain sharing content of the destination website. In this embodiment, the safety monitoring module 350 can match the website of the shared content with websites stored in a risk website database, to identify whether the destination website is a counterfeit website, or to identify whether the page of the website contains malicious plug-ins. In this way, whether the destination website is safe is identified by the safety monitoring module 350.

In this embodiment, the sending module 340 is used to send a notice showing processing failures to the client, when the safety monitoring module 350 identifies the destination website is unsafe, or the processing module 330 processes content of the destination website failures.

Optionally, the share processing server further includes a visiting request obtaining module 360, a browse parameter obtaining module 370, and a content sending module 380. The visiting request obtaining module 360 is used to obtain visiting request submitted by another client according to the accessible address of the content. In this embodiment, another client submits visiting request according to the accessible address of the content, when receiving the sharing message sent by the client, or receiving the accessible address shared in other ways. It is noted, in this embodiment of the present embodiment, the visiting request obtaining module 360 of the sharing processing server can be used to receive the request and also response to the visiting requests. In alternative embodiments, the visiting request obtaining module 360 of the sharing processing server can be used to store content of processed destination website in other network resource servers, the accessible address can be linked to the network resource servers, that is, the network resource servers can be used to receive the request and also response to the visiting requests.

The browse parameter obtaining module 370 is used to obtain the browse parameters of another client, the browse parameters includes terminal types, sizes or scales of different display pixel, etc. In alternative embodiments, the browse parameter obtaining module 370 and the visiting request obtaining module 360 can be integrated together.

The content sending module 380 is used to send contents of the destination corresponding to layout of another client, according to the browse parameters of another client. In operation, the content sending module 380 matches with the content of the destination website in a variety of contents of the destination websites with different layout, according to browse parameters of another client. The content of the destination website in a variety of contents of the destination websites with different layout is processed previously by the processing module 330. In addition, the content sending module 380 sends content of the destination website corresponding to layout of another client. In this way, a visitor has better experience when visiting the shared content of the users, and efficiency of visiting sharing content can be increased.

Figure 5:
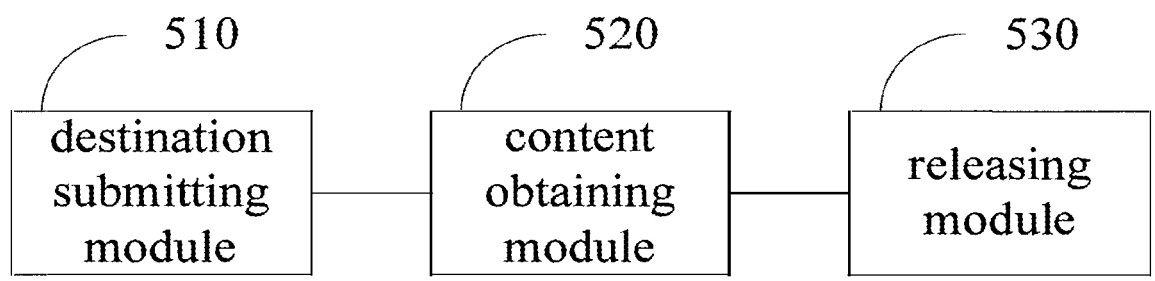
FIG. 5 is a block diagram of a client for sharing content, in accordance with an embodiment of the present disclosure.

FIG. 5 is a block diagram of a client for sharing content, in accordance with an embodiment of the present disclosure. The client can be a mobile phone, a tablet computer, a personal computer, a car navigation device, or other Internet terminal. As shown in FIG. 5, the client in this embodiment of present disclosure may include a destination submitting module 510, a content obtaining module 520, a releasing module 530.

The destination submitting module 510 is used to submit sharing request to the sharing processing server, the sharing request including a destination website. In this embodiment, the sharing request is triggered by clicking a button corresponding to sharing function on the user interface of a client (or user terminal), and can be initiated by the content obtaining module 510. The sharing request is submitted to the sharing processing server. The sharing request includes a destination website (URL) to be shared.

The content obtaining module 520 can be used to obtain an accessible address corresponding to the content of the destination website processed by the sharing processing server.

The releasing module 530 is used to replace the destination website by the accessible address and sends a sharing message including the accessible address. The sharing message includes the accessible address of the content. In this embodiment, the releasing module 530 replaces the destination website by the accessible address, thus realizing sharing function, that is, sending sharing message including the accessible address.

Figure 6:
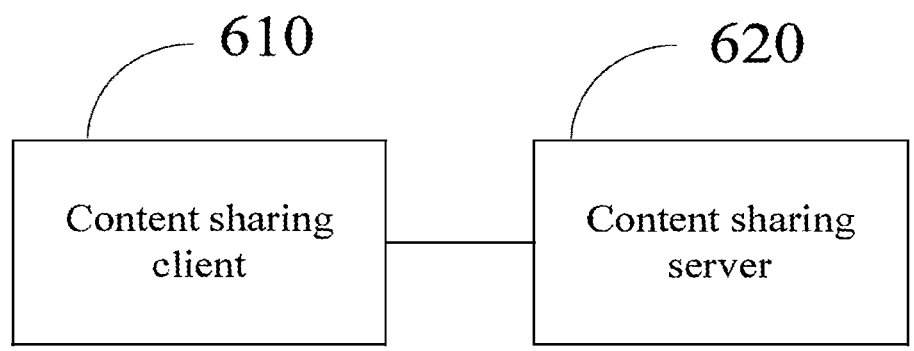
FIG. 6 is a block diagram of a system for sharing content, in accordance with an embodiment of the present disclosure.

FIG. 6 is a block diagram of a system for sharing content, in accordance with an embodiment of the present disclosure. As shown in FIG. 6, the system for sharing content includes a content sharing client 610 and a sharing processing server 620.

In this embodiment, the content sharing client 610 can be the one shown in FIG. 5 and described in the above embodiment. The content sharing client 610 is used to submit sharing request to the sharing processing server 620, the sharing request including a destination website. In addition, the content sharing client 610 obtain an accessible address corresponding to the content of the destination website processed by the sharing processing server. Furthermore, the content sharing client 610 replace the destination website by the accessible address and sends a sharing message including the accessible address. The sharing message includes the accessible address of the content.

The sharing processing sever 620 can be the one shown in FIG. 3 and FIG. 4, and is described in the above embodiment. The sharing processing sever 620 obtains sharing request submitted by the client 610. In addition, the sharing processing sever 620 obtains sharing content of the destination website, processes content of the destination website, and further generates an accessible address corresponding to the content of the destination website. Furthermore, the sharing processing server 620 sends an accessible address corresponding to the content of the destination website.

According to various embodiments of the present disclosure, the above sharing processing server processes content of the destination website according to the sharing request submitted by the client, and further sends an accessible address corresponding to the content of the destination website, thus realizing sharing function. In this way, the visitor has better experience when visiting the shared content of the users, and efficiency of visiting sharing content can be increased.

The server, the client, and the system described above according to various embodiments are merely illustrative. The units/modules depicted as separate components may be or may not be physically separated. Components shown as units may be or may not be physical units. That is, they may be located in one place or may be distributed to multiple network units. According to practical needs, part or all of the units/modules can be selected to achieve the purpose according to various embodiments.

The methods, the server, the client, and the system in accordance with various embodiments can be accomplished using a program/software to instruct related hardware. The hardware can include any suitable universal hardware, or any suitable specialized hardware including, e.g., specialized integrated circuits, specialized central processing unit (CPU), specialized memory, specialized components, etc. For example, the hardware can include personal computer, server, network device, etc. The program/software can be stored in a computer-readable storage medium including, e.g., ROM/RAM, magnetic disk, optical disk, etc.

The embodiments described above are merely preferred ones of the present disclosure but are not limitations to the protection scope of the present disclosure, and any variations or substitutions easily devised by those skilled in the art without departing from the spirit of the present disclosure fall within the scope of the protection. Therefore, the protection scope of the present disclosure shall be subject to that specified by the appended claims.

What is claimed is:

1. A method for sharing content, comprising:
   receiving a sharing request from a first client device to share a destination website, the sharing request including a uniform resource locator (URL) of the destination website to be shared;
   in response to the received sharing request,
      obtaining content displayed on the destination website according to the URL,
      processing the obtained content displayed on the destination website to (i) delete a first portion of the content displayed on the destination website based on a content type of the first portion of the content and a data representation structure of the destination website, and (ii) rearrange at least a second portion of the content,
   generating a unique accessible address corresponding to the processed content of the destination website,
   sending, by processing circuitry of a server, the generated unique accessible address of the processed content of the destination website to the first client device;
   receiving a visiting request to access the processed content from the second client device according to the unique accessible address; and
   sending the processed content of the destination website to the second client device.

2. The method of claim 1, wherein the processing the obtained content displayed on the destination website, comprises:
   extracting each portion of the content displayed on the destination website that corresponds to any of a plurality of predetermined content types; and
   removing redundant information of the content displayed on the destination website, the redundant information not corresponding to any of the plurality of predetermined content types.

3. The method of claim 1, further comprising:
   dividing a DOM (Document Destination Model) structure of a web page of the destination website into a variety of blocks using visual information of a DOM node in the web page;
   identifying at least one valid block from the variety of blocks of the web page; and
   extracting a core field in the identified at least one valid block that is to be included in the processed content of the destination website and clearing redundant information which includes other data and other elements in the web page,
   wherein the core field includes the second portion of the content, and the redundant information includes the first portion of the content.

4. The method of claim 1, wherein before the obtaining the content displayed on the destination website, the method further comprises:
   confirming the destination website is safe by comparing the destination website with a risk website database.

5. The method of claim 4, wherein the method further comprises:
   sending a notice to the first client device or sending original website content of the destination website to the first client device, when the destination website is identified to be unsafe or when the processing of the content of the destination website fails.

6. The method of claim 1, wherein the processed content of the destination website includes two or more layouts.

7. The method of claim 6, further comprising:
   receiving at least one browse parameter of the second client device;
   selecting one of the two or more layouts according to the received at least one browse parameter, wherein
   the sending the processed content of the destination website includes sending the processed content with the selected one of the two or more layouts.

8. The method of claim 7, wherein the at least one browse parameter indicates at least one of terminal type, display size, or display scale.

9. A sharing processing server, comprising:
   processing circuitry configured to receive a sharing request from a first client device to share a destination website, the sharing request including a uniform resource locator (URL) of the destination website to be shared;

in response to the received sharing request,
obtain content displayed on the destination website according to the URL,
process the obtained content displayed on the destination website to (i) delete a first portion of the content displayed on the destination website based on a content type of the first portion of the content and a data representation structure of the destination website, and (ii) rearrange at least a second portion of the content,
generate a unique accessible address corresponding to the processed content of the destination website,
send the generated unique accessible address of the processed content of the destination website to the first client device,
receive a visiting request to access the processed content from the second client device according to the unique accessible address, and
send the processed content of the destination web site to the second client device.

10. The server of claim 9, wherein the processing circuitry is configured to
extract each portion of the content displayed on the destination website that corresponds to any of a plurality of predetermined content types; and
remove redundant information of the content displayed on the destination website, the redundant information not corresponding to any of the plurality of predetermined content types.

11. The server of claim 10, wherein the processing circuitry is configured to
divide a DOM (Document Destination Model) structure of a web page of the destination website into a variety of blocks using visual information of a DOM node in the web page;
identify at least one valid block from the variety of blocks of the web page; and
extract a core field in the identified at least one valid block that is to be included in the processed content of the destination website and clear the redundant information which includes other data and other elements in the web page,
wherein the core field includes the second portion of the content, and the redundant information includes the first portion of the content.

12. The server of claim 9, wherein, before the obtaining the content displayed on the destination website, the processing circuitry is further configured to:
confirm the destination website is safe by comparing the destination website with a risk website database.

13. The server of claim 12, wherein the processing circuitry is configured to
send a notice to the first client device or send original website content of the destination website to the first client device, when the destination website is identified to be unsafe or when the processing of the content of the destination website fails.

14. The server of claim 9, wherein the processed content of the destination website includes two or more layouts.

15. The server of claim 14, wherein the processing circuitry is further configured to:
receive at least one browse parameter of the second client device; and
select one of the two or more layouts according to the received at least one browse parameter, wherein
the processing circuitry is configured to send the processed content of the destination website by sending the processed content with the selected one of the two or more layouts.

16. The server of claim 15, wherein the at least one browse parameter indicates at least one of terminal type, display size, or display scale.

17. A method for sharing content, comprising:
submitting a sharing request to share a destination website to a sharing processing server, the sharing request including a uniform resource locator (URL) of the destination website to be shared in a sharing message that is sent to a second client device, the sharing processing server processing the content displayed on the destination website to (i) delete a first portion of the content displayed on the destination website based on a content type of the first portion of the content and a data representation structure of the destination website, and (ii) rearrange at least a second portion of the content, and the sharing processing server generating a unique accessible address corresponding to the processed content of the destination website;
in response to the submitted sharing request, receiving, by processing circuitry of a first client device, the unique accessible address corresponding to the processed content of the destination website; and
sending, by the processing circuitry of the first client device, the sharing message to the second client device, the sharing message comprising the unique accessible address of the processed content, the sharing message allowing the second client device which receives the sharing message to submit a visiting request to the sharing processing server according to the unique accessible address.

18. The method of claim 17, wherein the processed content of the destination website omits redundant information removed from the content of the destination website, the redundant information not corresponding to any of a plurality of predetermined content types.

19. The method of claim 17, further comprising:
receiving a notice or receiving original website content of the destination website when the destination website is identified to be unsafe by the sharing processing server or when the processing of the content of the destination website fails in the sharing processing server.

* * * * *